(12) United States Patent  (10) Patent No.: US 8,089,838 B2
Saito  (45) Date of Patent: Jan. 3, 2012

(54) OPTICAL DISC APPARATUS AND TRACKING CONTROL METHOD

(75) Inventor: Kimihiro Saito, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/824,494

(22) Filed: Jun. 28, 2010

(65) Prior Publication Data

US 2011/0007619 A1  Jan. 13, 2011

(30) Foreign Application Priority Data

Jul. 10, 2009  (JP) ................................. 2009-163939

(51) Int. Cl.
G11B 7/00 (2006.01)
(52) U.S. Cl. ...................................................... 369/53.14
(58) Field of Classification Search ................. 369/47.1, 369/53.14, 53.15, 53.18, 53.19, 53.33, 53.35, 369/53.42, 53.1, 53.12, 53.13, 44.26, 44.32
See application file for complete search history.

(56) References Cited

U.S. PATENT DOCUMENTS 5,297,131 A * 3/1994 Tanaka ....................... 369/275.2
6,147,944 A * 11/2000 Kwon et al. ................ 369/44.32
6,359,842 B1 * 3/2002 Taguchi et al. ................. 369/14
6,894,957 B1 * 5/2005 Shimada ..................... 369/44.32
7,012,863 B2 * 3/2006 Hayashi ....................... 369/47.1
7,088,647 B2 * 8/2006 Han et al. .................... 369/44.32

FOREIGN PATENT DOCUMENTS

JP  2008-135144 A  6/2008

* cited by examiner

*Primary Examiner* — Nabil Z Hindi
(74) *Attorney, Agent, or Firm* — Wolf, Greenfield & Sacks, P.C.

(57) ABSTRACT

An optical disc apparatus includes: a rotation section to rotate an optical disc including a spiral or concentric track with a predetermined track center, with a rotational center of the optical disc as the center; a light source to emit a light beam; an objective lens to collect the light beam on the optical disc; a lens drive section to drive the objective lens in a tracking direction; a light-receiving section to receive a reflected light beam and generate a light-receiving signal; a tracking error signal generation section to generate a first tracking error signal based on the light-receiving signal; an eccentric-state acquisition section to acquire an eccentric state of the track center; a correction section to generate a corrected tracking error signal; and a drive control section to drive the objective lens in the tracking direction by the lens drive section based on the corrected tracking error signal.

9 Claims, 11 Drawing Sheets

Eccentric-state measurement processing procedure

Structure of optical disc

Structure of optical disc

Manufacture of optical disc

Manufacture of optical disc

Manufacture of optical disc

Eccentricity of optical disc (1)

Eccentricity of optical disc (2)

Structure of eccentric-state measurement apparatus

Structure of eccentric-state measurement apparatus

Eccentric-state measurement processing procedure

Structure of optical disc apparatus

Structure of optical pick-up

Formation of beam spot on optical disc (1)

Structure of photodetector

Formation of beam spot on optical disc (2)

Tracking control processing procedure

Structure of guide mark

OPTICAL DISC APPARATUS AND TRACKING CONTROL METHOD

BACKGROUND OF THE INVENTION

1. Field of the Invention

The present invention relates to an optical disc apparatus and a tracking control method, and is suitably applied to an optical disc apparatus that records information on an optical disc and reproduces the information therefrom, for example.

2. Description of the Related Art

From the past, optical disc apparatuses that record information including videos, music, and various types of data on optical discs such as a Blu-ray Disc (registered trademark, hereinafter referred to as BD), and reproduce the information from the optical discs have been widely used.

Particularly in recent years, an amount of information has been increased by achieving higher definition of videos, higher sound quality of music, and the like, and the number of contents to be recorded on one optical disc is also desired to be increased, which leads to a demand for an increase in a recording capacity of the optical discs.

As the optical discs, there is proposed a so-called multilayer optical disc in which a plurality of recording layers each having tracks formed in advance are provided and an information amount corresponding to the number of recording layers can be recorded as in a case of the BDs.

Further, as one of optical disc apparatuses that increase a recording capacity of an optical disc, there is also proposed an optical disc apparatus in which a relatively thick, single recording layer is provided on an optical disc, a plurality of layers with recording marks are provided in a thickness direction of the recording layer, and then an information amount corresponding to the plurality of layers is recorded (see, for example, Japanese Patent Application Laid-open No. 2008-135144 (FIG. 12)). In fact, the optical disc and the recording method as described above are also referred to as a volumetric optical disc and a volumetric optical recording method, respectively.

SUMMARY OF THE INVENTION

Incidentally, an optical disc often causes so-called eccentricity, that is, a rotational center when the optical disc rotates does not coincide with a center of a track that is spirally or concentrically formed thereon due to a problem of manufacturing accuracy or the like.

In a case where an optical disc apparatus rotates the optical disc as described above with the rotational center thereof as a center, a track to be followed fluctuates in an inner circumferential direction and outer circumferential direction.

Accordingly, the optical disc apparatus performs tracking control to drive an objective lens so that the objective lens is moved at high-speed in the inner circumferential direction and the outer circumferential direction, that is, a tracking direction, and causes a focus of a light beam to follow a desired track.

However, since the objective lens is moved at high-speed in the inner circumferential direction and the outer circumferential direction, that is, the tracking direction in the tracking control, a movement range thereof is limited.

In other words, there has been a problem that in a case where the manufacturing accuracy of the optical disc is low and an eccentricity amount of the center of the track is large, the optical disc apparatus may hardly follow a desired track even when performing the tracking control and therefore may hardly record or reproduce the information at this time correctly.

In view of the circumstances described above, it is desirable to propose an optical disc apparatus and a tracking control method that are capable of performing tracking control with high accuracy irrespective of the quality of an optical disc.

According to an embodiment of the present invention, there is provided an optical disc apparatus including: a rotation section to rotate an optical disc including one of a spiral track and a concentric track formed with a predetermined track center as a center, with a rotational center of the optical disc as the center; a light source to emit a light beam; an objective lens to collect the light beam on the optical disc; a lens drive section to drive the objective lens in a tracking direction that traverses the track; a light-receiving section to receive a reflected light beam that is reflected by the track formed on the optical disc and generate a light-receiving signal; a tracking error signal generation section to generate a first tracking error signal that represents a distance between the track and a focus of the light beam in the tracking direction based on the light-receiving signal; an eccentric-state acquisition section to acquire an eccentric state of the track center with respect to the rotational center of the optical disc; a correction section to generate a corrected tracking error signal that represents a distance with respect to the track with the rotational center of the optical disc as the center by correcting the first tracking error signal based on the eccentric state; and a drive control section to drive the objective lens in the tracking direction by the lens drive section based on the corrected tracking error signal.

According to an embodiment of the present invention, there is provided a tracking control method including: rotating, by a predetermined rotation section, an optical disc including one of a spiral track and a concentric track formed with a predetermined track center as a center, with a rotational center of the optical disc as the center; emitting a light beam from a predetermined light source and irradiating the light beam onto the optical disc via a predetermined objective lens; receiving, by a predetermined light-receiving section, a reflected light beam that is reflected by the track formed on the optical disc and generating a light-receiving signal; generating, based on the light-receiving signal, a first tracking error signal that represents a distance between the track and a focus of the light beam in a tracking direction that traverses the track; acquiring, by a predetermined eccentric-state acquisition section, an eccentric state of the track center with respect to the rotational center of the optical disc; generating, by a predetermined correction section, a corrected tracking error signal that represents a distance with respect to the track with the rotational center of the optical disc as the center by correcting the first tracking error signal based on the eccentric state; and driving, by a predetermined lens drive section, the objective lens in the tracking direction based on the corrected tracking error signal.

Accordingly, in the embodiment of the present invention, it is possible to cause the focus of the light beam to follow an ideal track with the rotational center as the center irrespective of an actual track by performing the tracking control based on the corrected tracking error signal, even when the track center is displaced from the rotational center.

According to the embodiment of the present invention, it is possible to cause a focus of a light beam to follow an ideal track with a rotational center as a center irrespective of an actual track by performing tracking control based on a corrected tracking error signal, even when a track center is displaced from the rotational center. Consequently, according to the embodiment of the present invention, it is possible to realize an optical disc apparatus and a tracking control method that are capable of performing tracking control with high accuracy irrespective of the quality of an optical disc.

These and other objects, features and advantages of the present invention will become more apparent in light of the following detailed description of best mode embodiments thereof, as illustrated in the accompanying drawings.

DESCRIPTION OF PREFERRED EMBODIMENTS

Hereinafter, modes for carrying out the present invention (hereinafter, referred to as embodiments) will be described with reference to the drawings. It should be noted that descriptions will be given in the following order.

1. First embodiment (example of irradiating light beams onto optical disc)
2. Second embodiment (example of forming guide marks on optical disc)
3. Other embodiments 1. First Embodiment (1-1. Structure and Manufacture of Optical Disc)
(1-1-1. Structure of Optical Disc)

Figure 1A:
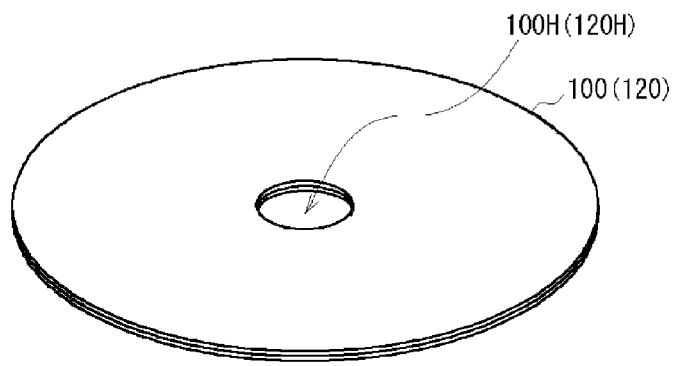
FIG. 1 are schematic diagrams showing a structure of an optical disc.

A structure of an optical disc that is used for recording and reproducing information will first be described in this embodiment. As shown in FIG. 1A, an optical disc 100 is formed in a thin, circular plate as a whole as in a case of a BD-type optical disc or the like and has a diameter of about 120 mm and a thickness of about 1.2 mm, for example.

At the center of the optical disc 100, a hole portion 100H having a diameter of about 15 mm is provided. The hole portion 100H penetrates the optical disc 100 such that the center thereof coincides with the center of the whole optical disc 100.

Figure 1B:
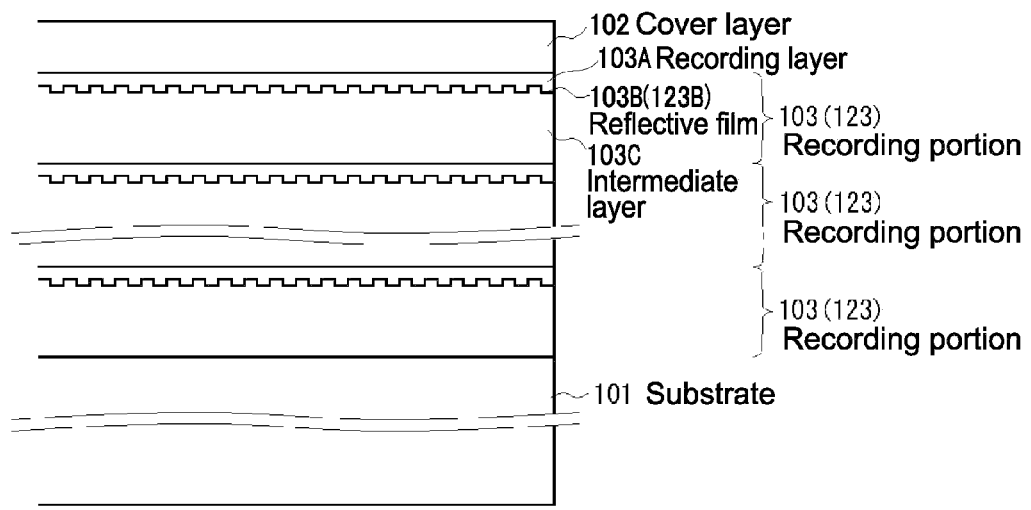

The optical disc 100 has a structure in which recording portions 103 constituted of, for example, 20 layers are laminated between a cover layer 102 and a substrate 101 as shown in a cross-sectional diagram of FIG. 1B.

The substrate 101 is formed of a material such as polycarbonate and glass and has a certain level of strength so that a shape of the whole optical disc 100 is kept to be a substantially circular plate.

The cover layer 102 is formed of a material having a certain level of strength and high light transmittance. The cover layer 102 transmits light that enters from one surface thereof to the other surface at a high transmittance and protects the adjacent recording portion 103.

Each of the recording portions 103 has a structure in which a recording layer 103A, a reflective film 103B, and an intermediate layer 103C are laminated. The recording layer 103A includes a recording mark that indicates information. The reflective film 103B includes a spiral track TR and reflects a light beam at a predetermined reflectance. The intermediate layer 103C maintains a gap between the recording layers 103A.

The recording layer 103A is formed of a fluorescent recording material that reacts with a blue light beam having a wavelength of about 405 nm, for example.

Specifically, when a light beam whose light intensity is high is irradiated to the recording layer 103A, a two-photon absorption reaction occurs in the vicinity of a focus of the light beam and a recording mark is formed accordingly. Further, when a light beam whose light intensity is low is irradiated to the recording layer 103A, if there is a recording mark formed in the vicinity of a focus of the light beam, a reproduction light beam having a wavelength different from that of the irradiated light beam is emitted, and if there is no recording mark, the light beam is transmitted as it is.

The reflective film 103B is formed in a relatively thin film formed of, for example, a dielectric multilayer film, and reflects an irradiated light beam at a ratio of, for example, 1%.

The track TR formed on the reflective film 103B is constituted by a combination of lands and grooves and is formed such that each interval between adjacent grooves of the track TR is a predetermined track pitch TP. Further, the track TR is given an address constituted of a series of numbers for each predetermined recording unit, and a spot at which information is to be recorded or reproduced can be specified by the address.

Specifically, it is assumed that the recording portion 103 normally includes a recording mark on the recording layer 103A at a spot corresponding to the track TR, that is, a spot overlapping the track TR of the reflective film 103B when seen from the cover layer 102 side.

The intermediate layer 103C is formed of a material having a certain level of strength and high light transmittance. The intermediate layer 103C transmits light that enters from one surface thereof to the other surface at a high transmittance and maintains the shape of the track TR.

(1-1-2. Manufacture of Optical Disc and Eccentric State Thereof)

Figure 2A:
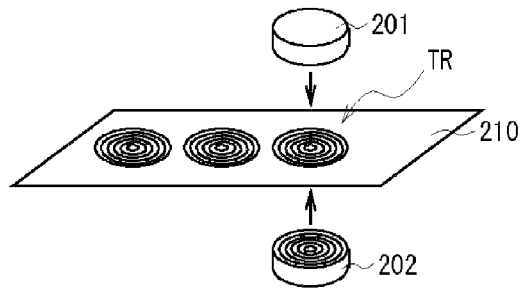
FIG. 2 are schematic diagrams for explaining manufacture of the optical disc.
Figure 2B:
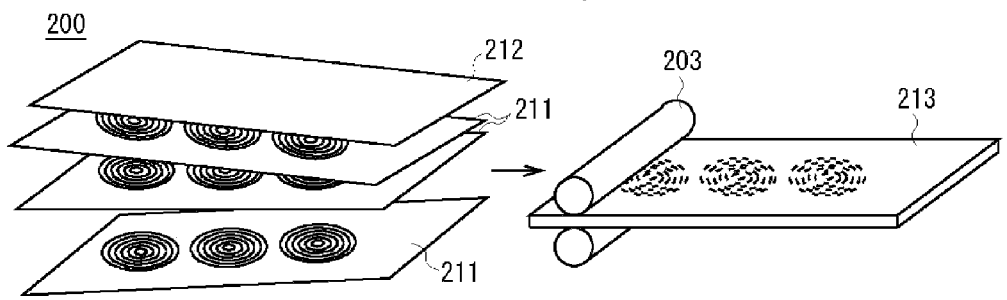
Figure 2C:
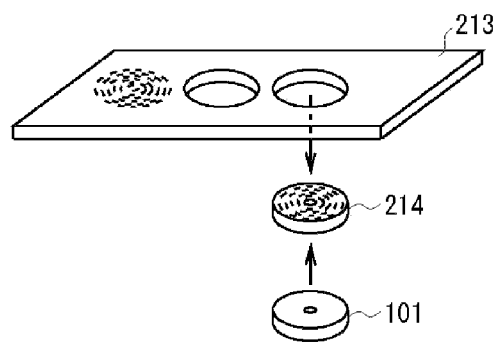

The optical disc 100 is manufactured by, for example, an optical disc manufacturing apparatus 200 shown in FIGS. 2A to 2C.

As shown in FIG. 2A, the optical disc manufacturing apparatus 200 performs press working by sandwiching a thin plate-like sheet material 210 between dies 201 and 202 to form a track TR constituted of lands and grooves on one surface of the sheet material 210. The sheet material 210 corresponds to the intermediate layer 103C (FIG. 1B).

Subsequently, the optical disc manufacturing apparatus 200 forms a dielectric multilayer film and a fluorescent recording material layer on the surface of the sheet material 210 on which the track TR is formed, to thereby form a sheet material 211 (not shown). The sheet material 211 corresponds to the recording portion 103 in which the intermediate layer 103C, the reflective film 103B, and the recording layer 103A are laminated.

Then, as shown in FIG. 2B, the optical disc manufacturing apparatus 200 first laminates the sheet materials 211 and then a cover material 212 on top of the laminate, and pressure-bonds them by a pressure-bonding device 203 to thereby form a sheet material 213. In fact, the cover material 212 corresponds to the cover layer 102.

In this case, the optical disc manufacturing apparatus 200 performs pressure-bonding after alignment is performed such that the tracks TR formed on the individual sheet materials 211 are aligned with one another.

Next, as shown in FIG. 2C, the optical disc manufacturing apparatus 200 punches out circular plates from the sheet material 213 based on positions of the tracks TR to produce circular plate materials 214. Subsequently, the optical disc manufacturing apparatus 200 attaches the substrate 101 formed in a circular plate in advance to each circular plate material 214 to thereby produce the optical disc 100.

Incidentally, the optical disc manufacturing apparatus 200 performs alignment when punching out circular plates from the sheet material 213, but displacement is caused to some extent in actuality.

Figure 3:
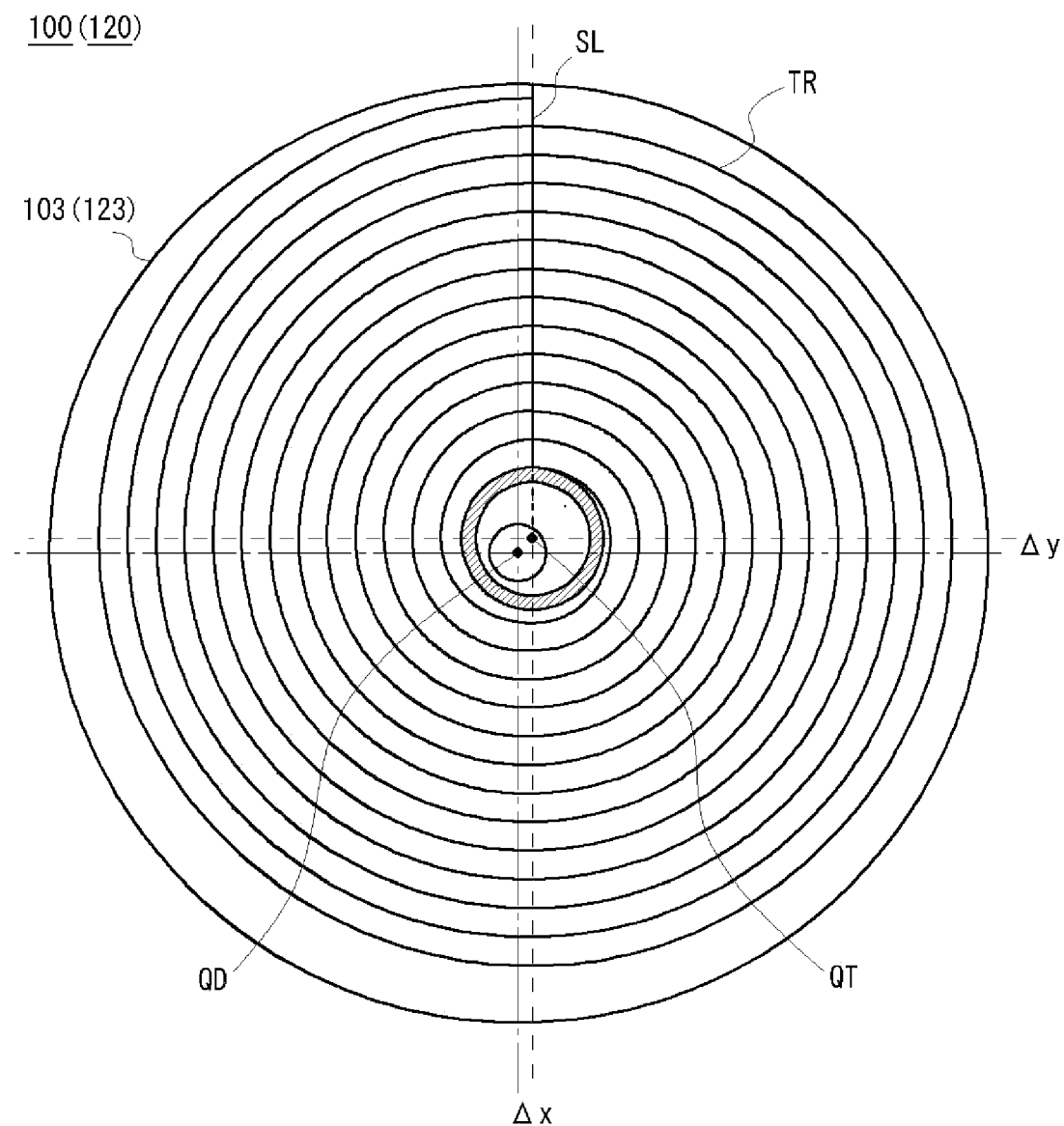
FIG. 3 is a schematic diagram showing eccentricity of the optical disc (1)

For that reason, as shown in FIG. 3, the optical disc 100 is in a state where a track center QT as an imaginary center of the track TR on the recording portion 103 is displaced from a rotational center QD as an imaginary center based on the shape of the optical disc 100 and also as a rotational center in the rotation. In other words, the track TR is eccentric in the recording portion 103 of the optical disc 100.

Further, the optical disc manufacturing apparatus 200 also causes displacement to some extent in actuality in the alignment of the tracks TR when the plurality of sheet materials 211 are laminated.

Therefore, in the optical disc 100, each of the recording portions 103 has different displacement between the rotational center QD and the track center QT, that is, a different eccentric state of the track center QT.

Incidentally, a reference line SL that indicates a reference position regarding a rotational direction is formed on the reflective film 103B and the intermediate layer 103C of the optical disc 100. The reference line SL is linearly formed so as to penetrate the spirally-formed track TR in a radius direction, and is formed like a mirror that reflects a light beam at a high reflectance, for example. Accordingly, the reference line SL appears once per circle in a case where the track TR is followed.

Figure 4:
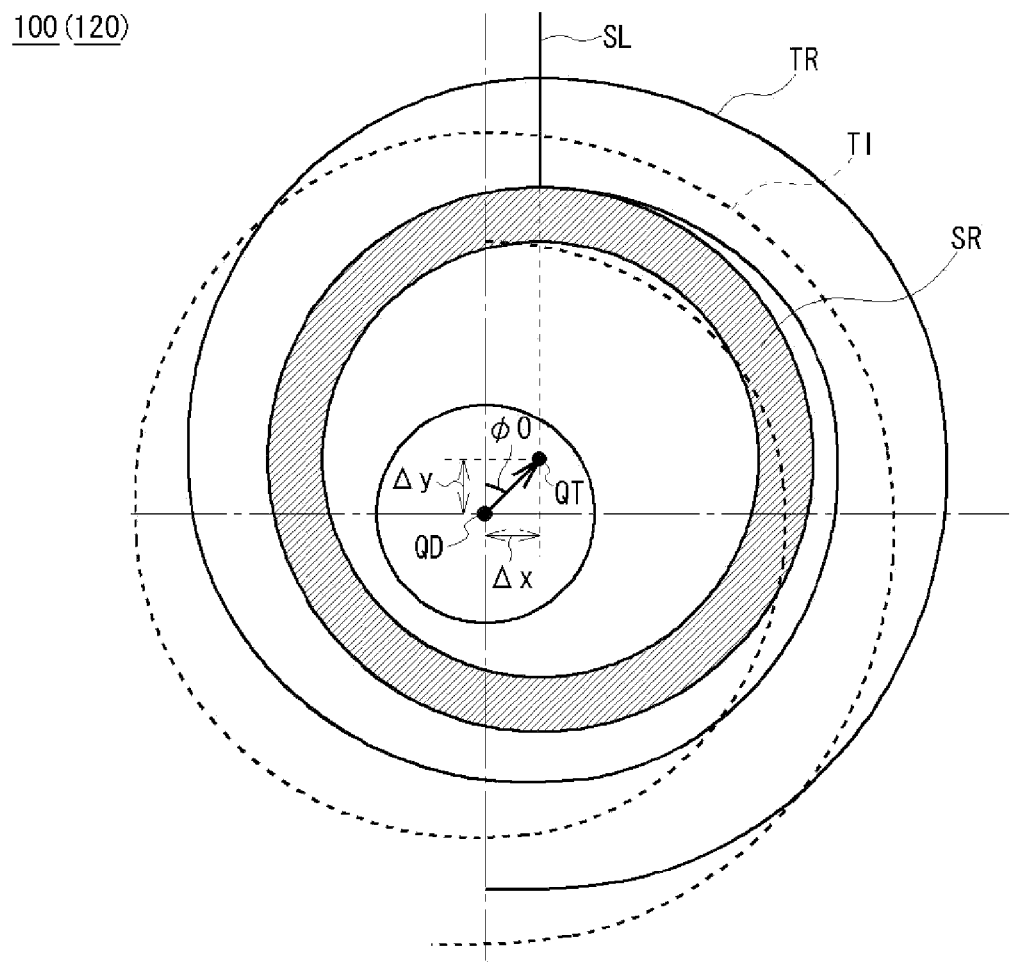
FIG. 4 is a schematic diagram showing the eccentricity of the optical disc (2)

Further, a reference ring SR is formed on the reflective film 103B and the intermediate layer 103C of the optical disc 100 on an inner circumferential side of the track TR as shown in FIG. 4 in which the vicinity of the rotational center QD is enlarged. The reference ring SR is substantially ring-shaped and is integrally formed with the track TR by the dies 201 and 202 (FIG. 2A), and accordingly the center of the reference ring SR is the track center QT of the track TR.

Here, assuming that the rotational center QD is an origin point and the reference line SL is a reference of a rotational angle, the position of the track center QT with respect to the rotational center QD can be expressed by an eccentric angle $\phi 0$ [rad] that represents a direction of eccentricity and an eccentric distance GD [mm] that represents a distance of eccentricity.

In fact, the eccentric distance GD can be expressed as the number of grooves of the track TR by being divided by the track pitch TP. Hereinafter, the number of grooves of the track TR obtained as described above is referred to as an eccentric track groove number GT.

Further, assuming that the rotational center QD is an origin point and an x axis parallel to the reference line SL and a y axis orthogonal to the x axis are defined, the eccentric state of the track center QT can also be expressed as a distance $\Delta x$ and a distance $\Delta y$ that are an x component and a y component of the eccentric distance GD, respectively.

As described above, the eccentric state of each of the recording portions 103 of the optical disc 100 can be expressed by a combination of the eccentric angle $\phi 0$ and the eccentric distance GD (or eccentric track groove number GT), or a combination of the distance $\Delta x$ and the distance $\Delta y$.

(1-1-3. Measurement of Eccentric State of Optical Disc)

In the embodiment of the present invention, a displaced state of the track center QT with respect to the rotational center QD is measured in advance and recorded as displacement information on the optical disc 100, as initialization processing of the optical disc 100.

Figure 5A:
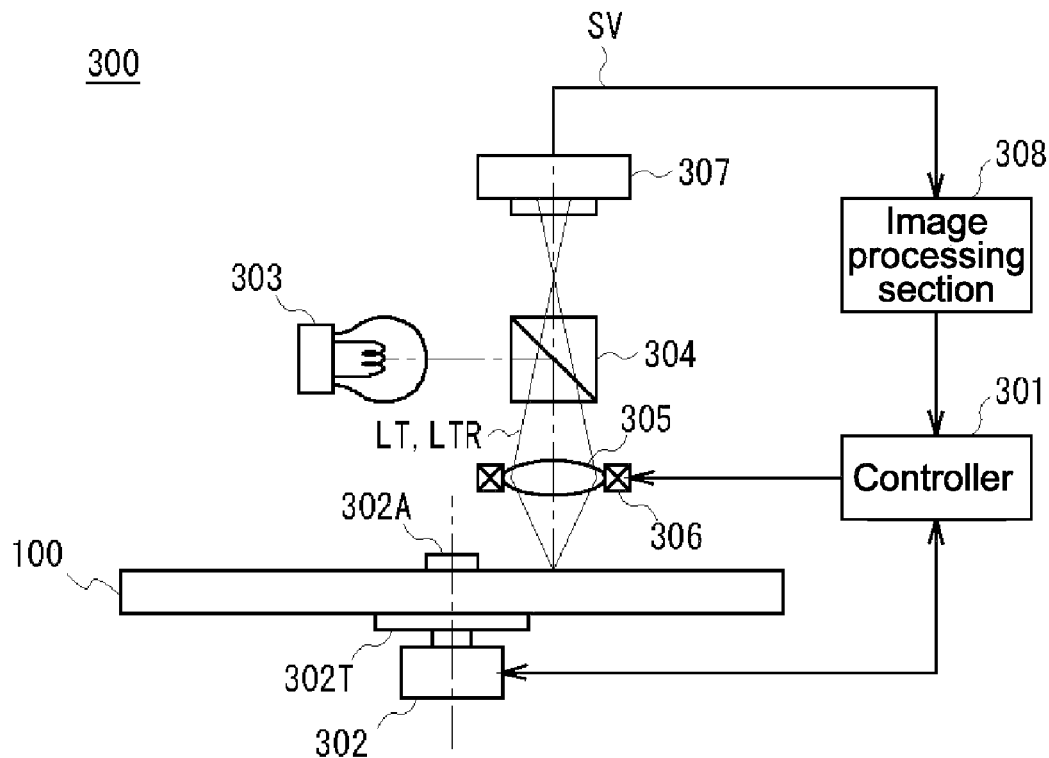
FIG. 5 are schematic diagrams showing a structure of an eccentric-state measurement apparatus.

An eccentric-state measurement apparatus 300 shown in FIG. 5A has a structure similar to a general microscope as a whole and measures a displaced state of each of the recording portions 103 of the optical disc 100.

A controller 301 of the eccentric-state measurement apparatus 300 collectively controls the whole eccentric-state measurement apparatus 300. When receiving a predetermined start instruction, the controller 301 rotates the optical disc 100 integrally with a turntable 302T via a spindle motor 302 at a predetermined rotational speed.

The optical disc 100 is mounted onto the turntable 302T such that a center shaft 302A of the spindle motor 302 is fitted into the hole portion 100H (FIG. 1). In this case, the rotational center QD of the optical disc 100 (FIG. 4) substantially coincides with a rotational center of the center shaft 302A of the spindle motor 302.

In fact, the controller 301 can recognize a rotational angle of the turntable 302T and optical disc 100 on the spindle motor 302.

In addition, the controller 301 causes a light source 303 to emit light to irradiate illumination light LT to a beam splitter 304. The beam splitter 304 reflects the illumination light LT at a predetermined ratio and causes it to enter an objective lens 305.

The objective lens 305 collects the illumination light LT on recording portions 103 of the optical disc 100. The controller 301 controls an actuator 306 to move the objective lens 305 in an optical axis direction of the illumination light LT and set a focus thereof on a desired recording portion 103.

In this case, the illumination light LT is reflected by the reflective film 103B of the recording portion 103 and becomes reflected illumination light LTR expressing an image of the reflective film 103B. The reflected illumination light LTR is converted into convergent light from divergent light by the objective lens 305, passes through the beam splitter 304 at a predetermined ratio, and is irradiated onto an image pick-up surface of an image pick-up device 307.

The image pick-up device 307 performs photoelectric conversion on the reflected illumination light LTR to generate an image signal SV, and supplies it to an image processing section 308.

Figure 5B:
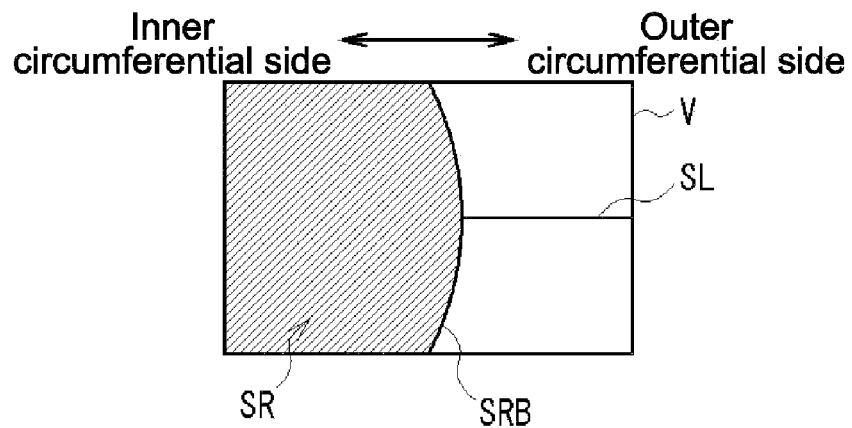

Incidentally, the eccentric-state measurement apparatus 300 is set so that the focus of the illumination light LT is set on the vicinity of a boundary of the reference ring SR (FIG. 4) on an outer circumferential side. Accordingly, the image signal SV represents an image V as shown in FIG. 5B, for example.

In the image V, the boundary of the reference ring SR on the outer circumferential side (hereinafter, referred to as reference-ring boundary SRB) moves to the inner circumferential side or the outer circumferential side along with the rotation of the optical disc 100 in accordance with eccentric states of the track TR and the reference ring SR on the recording portion 103.

Therefore, when the reference-ring boundary SRB is moved to the outermost circumferential side, the controller 301 can recognize, as an eccentric direction, a direction in which the focus of the illumination light LT on the recording portion 103 is positioned.

Incidentally, the reference line SL cyclically appears in the image V. Further, the controller 301 can recognize the rotational angle of the optical disc 100 as described above. Accordingly, the controller 301 can calculate the recognized eccentric direction as a relative angle with respect to the reference line SL, that is, the eccentric angle $\phi 0$ (FIG. 4).

Moreover, a difference between a position where the reference-ring boundary SRB is positioned on the outermost circumferential side and a position where the reference-ring boundary SRB is positioned on the innermost circumferential side in the image V takes a value twice as large as the eccentric distance GD. Accordingly, the controller 301 can also calculate the eccentric distance GD based on the movement range of the reference-ring boundary SRB in the image V.

Figure 6:
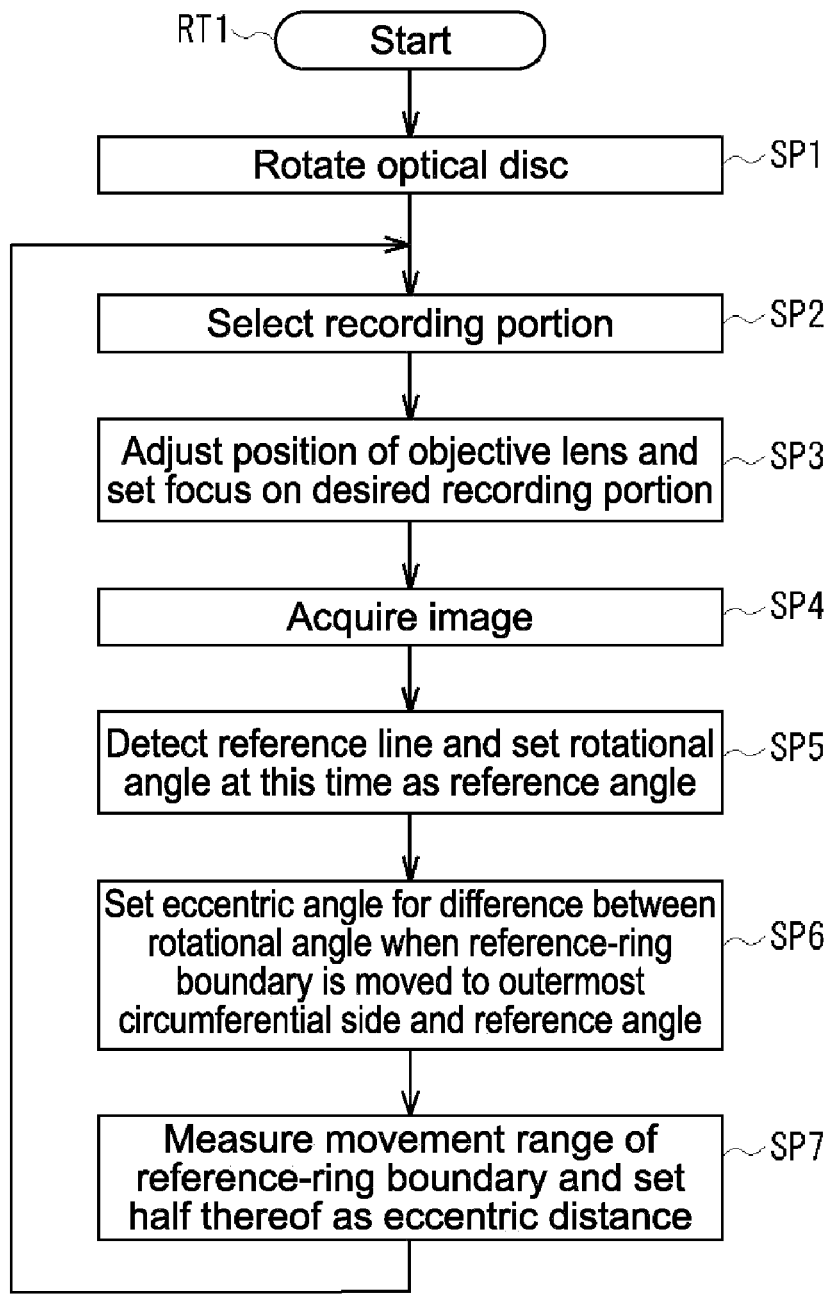
FIG. 6 is a flowchart showing an eccentric-state measurement processing procedure.

In actuality, the controller 301 executes a series of eccentric-state measurement processing according to a flowchart of FIG. 6.

Specifically, when the optical disc 100 is mounted onto the turntable 302T and the controller 301 receives a predetermined start instruction, the controller 301 starts an eccentric-state measurement processing procedure RT1 to proceed to Step SP1.

In Step SP1, the controller 301 rotates the optical disc 100 via the spindle motor 302 at a predetermined rotational speed and then proceeds to Step SP2.

In Step SP2, the controller 301 receives an instruction to select a recording portion 103 to be a target whose eccentric state is measured, and then proceeds to Step SP3.

In Step SP3, the controller 301 sets a focus of the objective lens 305 on a desired recording portion 103 via the actuator 306, and then proceeds to Step SP4.

In Step SP4, the controller 301 supplies the image signal SV supplied from the image pick-up device 307 to the image processing section 308 and causes the image processing section 308 to perform predetermined image processing on the image V, and then proceeds to Step SP5.

In Step SP5, the controller 301 detects the reference line SL from the image V to set a rotational angle of the optical disc 100 at this time as a reference angle, and proceeds to Step SP6.

In Step SP6, the controller 301 sets a difference between a rotational angle of the optical disc 100 when the reference-ring boundary SRB is located on the outermost circumferential side and the reference angle as an eccentric angle $\phi 0$, and proceeds to Step SP7.

In Step SP7, the controller 301 measures a movement range of the reference-ring boundary SRB and sets the half of the movement range as an eccentric distance GD. Accordingly, the controller 301 completes the measurement of the eccentric state of the recording portion 103 as the current measurement target.

After that, the controller 301 returns to Step SP2 and repeats the measurement of an eccentric state again for all the other recording portions 103 in the same manner. When the controller 301 completes the measurement of an eccentric state for all the recording portions 103 or receives a predetermined instruction to stop the measurement, the controller 301 terminates the eccentric-state measurement processing procedure RT1.

After the eccentric states are measured, eccentricity information indicating the measured eccentric states is recorded in a predetermined management region provided at the innermost circumferential portion of the optical disc 100 by a predetermined recording apparatus.

As described above, as initialization processing, the eccentric states of the recording portions 103 are measured and the eccentricity information indicating the measured eccentric states is recorded in the management region in the optical disc 100.

(1-2. Structure of Optical Disc Apparatus)

Figure 7:
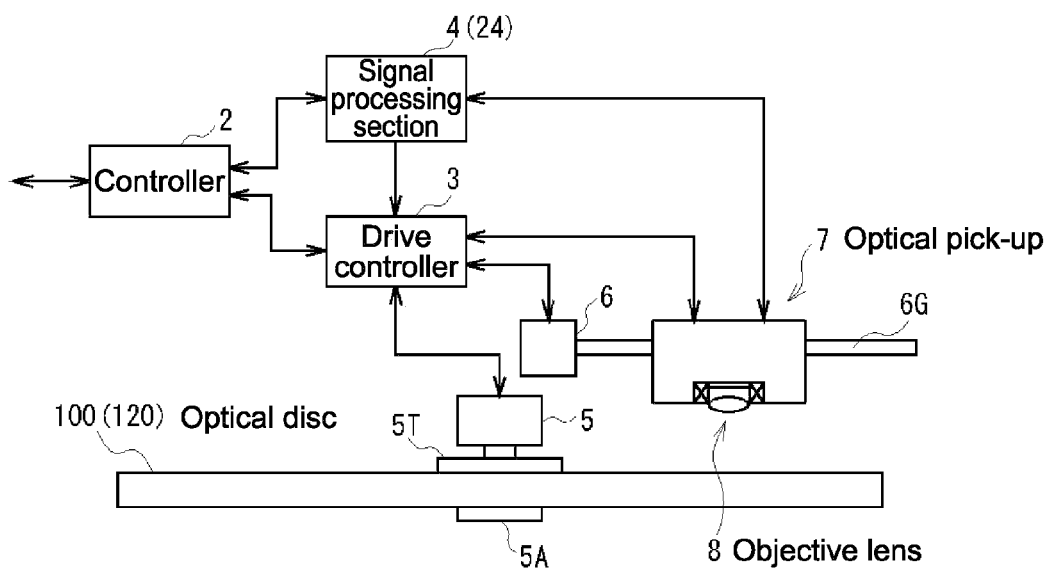
FIG. 7 is a schematic diagram showing a structure of an optical disc apparatus.

Next, a structure of an optical disc apparatus 1 that records information on the optical disc 100 and reproduces the information therefrom will be described. The whole optical disc apparatus 1 is collectively controlled by a controller 2 as shown in FIG. 7.

The controller 2 is mainly constituted of a CPU (Central Processing Unit) (not shown). The controller 2 reads out various programs from a ROM (Read Only Memory) (not shown) and develops them in a RAM (Random Access Memory) (not shown) to thereby execute various types of processing such as information recording processing and information reproduction processing.

For example, upon receiving an information recording command, recording information, and recording address information from an external apparatus or the like (not shown), the controller 2 supplies the recording address information and a drive command to a drive controller 3 and supplies the recording information to a signal processing section 4. In fact, the recording address information is information that indicates an address at which the recording information is to be recorded.

The optical disc 100 is mounted onto a turntable 5T such that a center shaft 5A of a spindle motor 5 is fitted into the hole portion 100H (FIG. 1) as in the case of the eccentric-state measurement apparatus 300 (FIG. 5). In this case, the rotational center QD of the optical disc 100 (FIG. 4) substantially coincides with a rotational center of the center shaft 5A of the spindle motor 5.

The drive controller 3 controls, according to the drive command, the drive of the spindle motor 5 to rotate the optical disc 100 at a predetermined rotational speed and controls the drive of a sled motor 6. Accordingly, the drive controller 3 moves an optical pick-up 7 to a position corresponding to the recording address information in a radius direction (that is, inner circumferential direction or outer circumferential direction) of the optical disc 100 along a movement axis 6G.

In fact, the spindle motor 5 can generate information on the rotational angle of the optical disc 100 and supply it to the signal processing section 4 via the drive controller 3.

The signal processing section 4 generates a recording signal by performing various types of signal processing such as predetermined encoding processing and modulation processing on the supplied recording information, and supplies the recording signal to the optical pick-up 7.

The optical pick-up 7 sets a focus F of a light beam L on a desired recording portion 103 of the optical disc 100 (FIG. 1B) by performing focus control and tracking control to be described later. Together with this operation, the optical pick-up 7 forms a recording mark on the recording layer 103A by adjusting a light intensity of the light beam L in accordance with the recording signal supplied from the signal processing section 4.

Further, upon receiving an information reproduction command or the like from an external apparatus (not shown), for example, the controller 2 supplies a drive command to the drive controller 3 and supplies a reproduction processing command to the signal processing section 4.

The drive controller 3 rotates the optical disc 100 at the predetermined rotational speed as in the case of recording the information, and moves the optical pick-up 7 to a position corresponding to the information reproduction command.

The optical pick-up 7 sets the focus F of the light beam L on a track TR of a recording portion 103 of the optical disc 100 by performing the focus control and the tracking control to be described later, and adjusts the light intensity of the light beam L for reproduction.

Here, if there is a recording mark at a position on which the focus F of the light beam L is set, a fluorescent beam LFR is generated. The optical pick-up 7 detects the fluorescent beam LFR and supplies a light-receiving signal corresponding to a light amount of the fluorescent beam LFR to the signal processing section 4.

The signal processing section 4 generates reproduction information by performing various types of signal processing such as predetermined decoding processing and demodulation processing on the supplied light-receiving signal, and supplies the reproduction information to the controller 2. The controller 2 transmits the reproduction information to the external apparatus (not shown).

As described above, in the optical disc apparatus 1, the controller 2 controls the optical pick-up 7 to record information on the optical disc 100 and reproduce the information therefrom.

(1-3. Structure of Optical Pick-Up)

Figure 8:
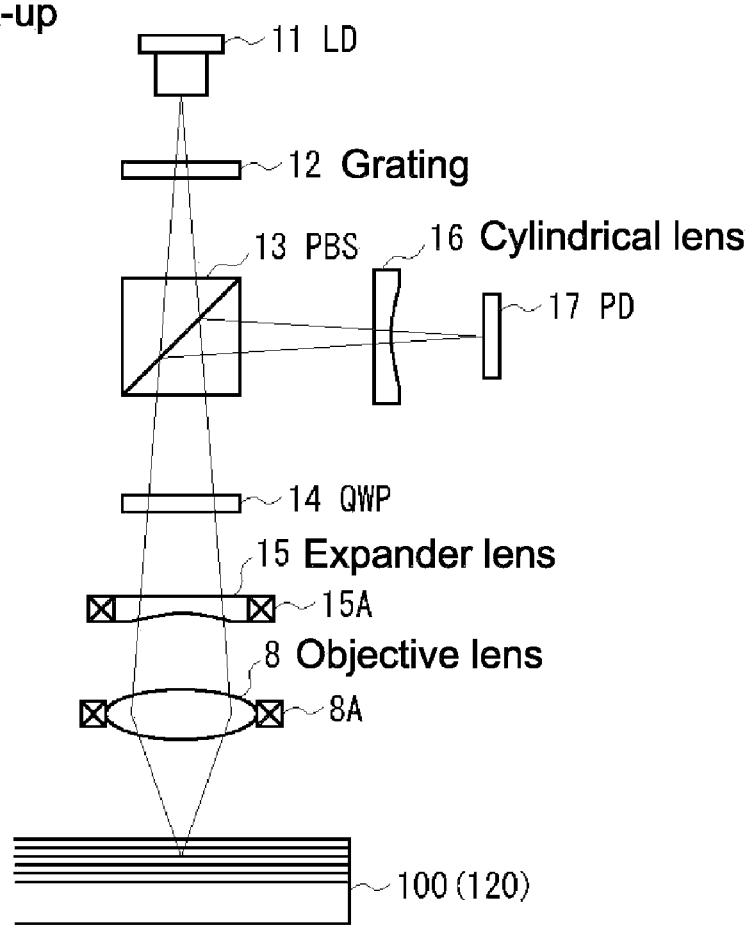
FIG. 8 is a schematic diagram showing a structure of an optical pick-up.

Next, a structure of the optical pick-up 7 will be described. The optical pick-up 7 is constituted of many optical components as shown in FIG. 8.

A laser diode (LD) 11 emits a light beam L having a wavelength of about 405 nm based on the control of the drive controller 3 (FIG. 7) and causes the light beam L to enter a grating 12. In fact, an attachment position, an attachment angle, or the like of the laser diode 11 is adjusted so that the light beam L becomes p-polarized light.

The grating 12 divides the light beam L into a main beam and two sub-beams and causes each beam to enter a polarized beam splitter (PBS) 13. It should be noted that the main beam and the two sub-beams are hereinafter referred to simply as the light beam L for convenience of description.

The polarized beam splitter 13 reflects or transmits the light beam L at a different ratio in accordance with a polarization direction of the light beam L. In actuality, the polarized beam splitter 13 transmits components of the p-polarized light (that is, almost all components) out of the incident light beam L so that the components enter a ¼ wavelength plate (QWP) 14.

The ¼ wavelength plate 14 performs interconversion of a light beam between linear polarization and circular polarization. The ¼ wavelength plate 14 converts the light beam L constituted of the p-polarized light into, for example, left-circularly polarized light and causes it to enter an expander lens 15.

The expander lens 15 is moved in an optical axis direction of the light beam L by an actuator 15A according to the control of the drive controller 3 (FIG. 7). In actuality, the expander lens 15 converts a divergent angle of the light beam L to cause the light beam L to enter an objective lens 8.

The objective lens 8 collects the light beam L and irradiates it onto the optical disc 100. In this case, the focus F of the light beam L is formed at a position that corresponds to the divergent angle of the light beam L at the stage when the light beam L enters the objective lens 8.

In the optical disc apparatus 1, in actuality, by adjusting the position of the expander lens 15 via the drive controller 3 so that the divergent angle of the light beam L is adjusted, the focus F of the light beam L is set on a desired recording portion 103.

Figure 9:
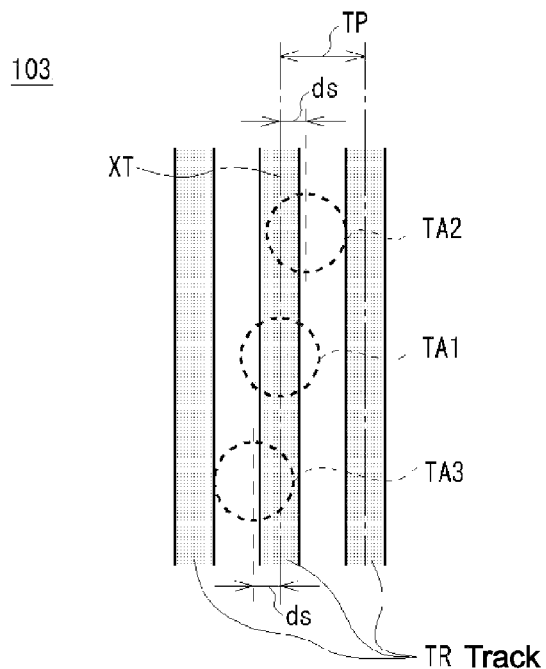
FIG. 9 is a schematic diagram showing formation of spots on the optical disc (1)

In this case, a spot TA1 made by the main beam and spots TA2 and TA3 made by the sub-beams are formed on the reflective film 103B of the recording portion 103 of the optical disc 100 as shown in FIG. 9.

The spots TA2 and TA3 are displaced from the spot TA1 by spot intervals ds in opposite directions with reference to a tracking direction. The spot interval ds is set so as to be ¼ of the track pitch TP. In fact, FIG. 9 shows a center line XT that represents an imaginary center of the track TR for convenience of description.

The light beam L is reflected by the reflective film 103B of the recording portion 103 (FIG. 1B) and becomes a reflected light beam LR as right-circularly polarized light.

The reflected light beam LR is converted into convergent light from divergent light by the objective lens 8 (FIG. 8) so that a convergent angle of the reflected light beam LR is converted by the expander lens 15, and enters the ¼ wavelength plate 14. The ¼ wavelength plate 14 converts the reflected light beam LR as the right-circularly polarized light into s-polarized light and causes the s-polarized light to enter the polarized beam splitter 13.

The polarized beam splitter 13 reflects the reflected light beam LR as the s-polarized light so that the reflected light beam LR enters a cylindrical lens 16. The cylindrical lens 16 imparts astigmatism to the reflected light beam LR to irradiate the reflected light beam LR to a photodetector (PD) 17.

Figure 10:
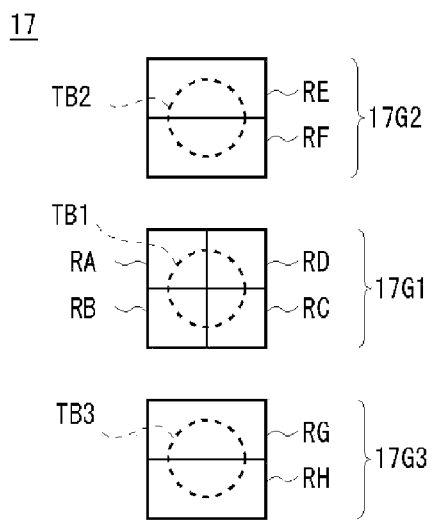
FIG. 10 is a schematic diagram showing a structure of a photodetector.

The photodetector 17 is provided with light-receiving area groups 17G1, 17G2, and 17G3, each of which is substantially square, as shown in FIG. 10.

In the light-receiving area group 17G1, a spot TB1 is formed by the main beam of the reflected light beam LR. Further, in the light-receiving area group 17G2 and the light-receiving area group 17G3, a spot TB2 and a spot TB3 are formed by the sub-beams of the reflected light beam LR, respectively.

Moreover, the light-receiving area group 17G1 is divided into four light-receiving areas RA, RB, RC, and RD. The light-receiving area group 17G2 is divided into two light-receiving areas RE and RF, and the light-receiving area group 17G3 is divided into two light-receiving areas RG and RH.

The light-receiving areas RA, RB, RC, RD, RE, RF, RG, and RH generate light-receiving signals SA, SB, SC, SD, SE, SF, SG, and SH, respectively, in accordance with the respective amounts of received light, and supply them to the signal processing section 4 (FIG. 7).

By performing operation processing according to Expression (1) below based on the light-receiving signals SA, SB, SC, and SD, the signal processing section 4 generates a focus error signal SFE based on the astigmatism and supplies it to the drive controller 3.

[Expression 1]

$$SFE = (SA+SC) - (SB+SD) \quad (1)$$

In fact, the focus error signal SFE represents a displacement amount in the focus direction between a target position on which the focus F of the light beam L is to be set and an actual light irradiation position.

Further, the signal processing section 4 generates a tracking error signal STE that represents a displacement amount in the tracking direction between the target position on which the focus F of the light beam L is to be set and the actual light irradiation position by predetermined operation processing based on the light-receiving signal SA, and supplies the tracking error signal STE to the drive controller 3, which will be described later in detail.

The drive controller 3 controls an actuator 8A based on the focus error signal SFE and the tracking error signal STE to move the objective lens 8, and sets the focus F of the light beam L on a target position, that is, performs servo control.

As described above, the optical pick-up 7 irradiates the light beam L to the recording portion 103 of the optical disc 100 and generates the light-receiving signals SA to SH by receiving the reflected light beam LR obtained at this time.

In response to the above operation, the optical disc apparatus 1 generates the focus error signal SFE and the tracking error signal STE based on the light-receiving signals SA to SH and performs servo control of the objective lens 8 so that the focus F of the light beam L is set on the target position.

(1-4. Generation of Tracking Error Signal)

(1-4-1. Principle of Generation of Tracking Error Signal)

An ideal state is first assumed. If the rotational center QD of the optical disc 100 (FIG. 4) coincides with the track center QT and there is no eccentricity, the optical disc apparatus 1 can set the focus F of the light beam L on an ideal track TR with the rotational center QD as the center by appropriately performing tracking control. Hereinafter, the ideal track TR of the optical disc 100 with the rotational center QD as the center will be referred to as an ideal track TI.

In the actual optical disc 100 (FIGS. 3 and 4), however, the track center QT is displaced from (that is, eccentric with respect to) the rotational center QD as described above.

This eccentric state can be expressed by the eccentric angle φ0 and the eccentric distance GD (or eccentric track groove number GT) as described above. Here, with the reference line SL formed on the recording portion 103 of the optical disc 100 (FIG. 3) being set as a reference, a spot on which the focus F of the light beam L is set (hereinafter, referred to as irradiation spot) will be defined as an irradiation angle φ.

A displacement amount between the actual track TR and the ideal track TI in the tracking direction at the irradiation spot can be expressed as a track displacement amount d(φ) [mm] shown in Expression (2) below.

[Expression 2]

$$d(\varphi) = GD \cdot \cos(\varphi + \varphi 0) \quad (2)$$

The track displacement amount d(φ) is a value of a distance. When the track displacement amount d(φ) is multiplied by 2·π and then divided by the track pitch TP, a track displacement phase a(φ) [rad] in which the track pitch TP is set as one cycle can be obtained. The track displacement phase a(φ) can be expressed as in Expression (3) below.

[Expression 3]

$$a(\phi) = \frac{2 \cdot \pi \cdot GD \cdot \cos(\phi + \phi 0)}{TP} \quad (3)$$

The track displacement phase a(φ) is a value that is variable in accordance with the irradiation angle φ, but is also represented simply as a track displacement phase a hereinafter for convenience in writing.

Next, based on the light-receiving signals SA to SH, a first tracking error signal STE1 and a second tracking error signal STE2 are calculated according to Expressions (4) and (5) below.

[Expression 4]

$$STE1 = (SA+SD) - (SB+SC) \quad (4)$$

[Expression 5]

$$STE2 = (SE-SF) - (SG-SH) \quad (5)$$

The first tracking error signal STE1 represents a displacement amount between the spot TA1 (FIG. 9) and the track TR, and the second tracking error signal STE2 represents a displacement amount between the spot TA2 or spot TA3 and the track TR.

Figure 11:
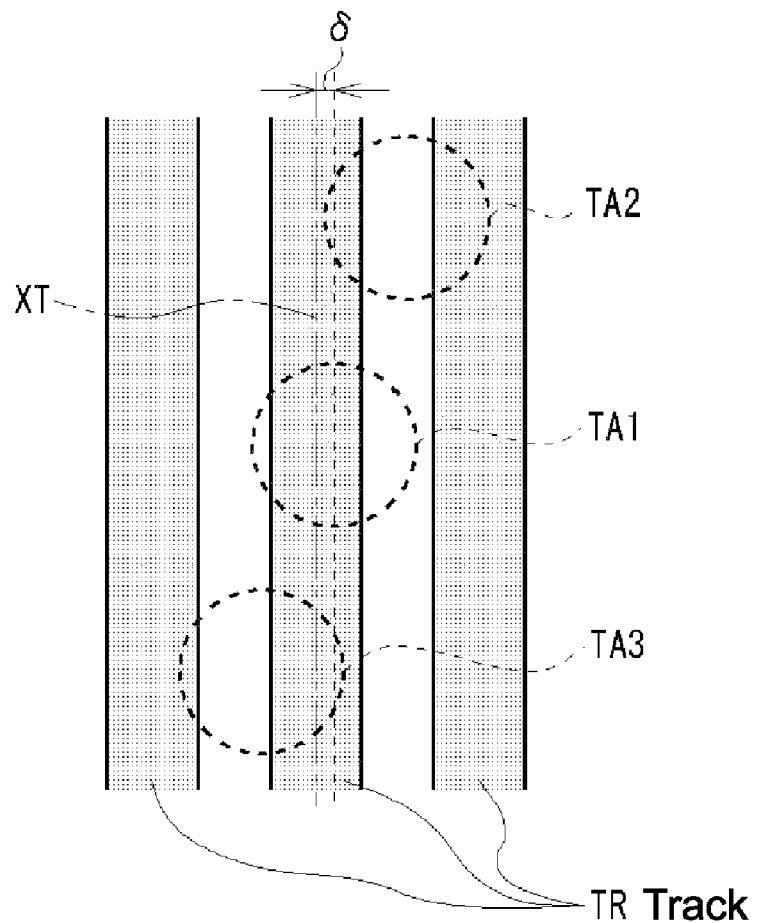
FIG. 11 is a schematic diagram showing the formation of the spots on the optical disc (2)

Assuming that the center of the spot TA1 is displaced from the center line XT of the track TR by a tracking error phase δ as shown in FIG. 11 that corresponds to FIG. 9, the tracking error phase δ is a value that represents a distance in the tracking direction as a phase in which the track pitch TP is set as one cycle.

Further, a distance from the irradiation spot on which the focus F of the light beam L is actually set to a spot on the ideal track TI with the rotational center QD as the center (hereinafter referred to as ideal spot) is defined as an actual displacement phase e expressed by the phase in which the track pitch TP is set as one cycle.

The actual displacement phase e corresponds to an additional value of the track displacement phase a and the distance δ and can be expressed as in Expression (6) below.

[Expression 6]

$$e = a + \delta \quad (6)$$

Using predetermined coefficients Ka and Kb, the first tracking error signal STE1 and the second tracking error signal STE2 can be expressed as in Expressions (7) and (8) below.

[Expression 7]

$$STE1 = Ka \cdot \sin \delta \quad (7)$$

[Expression 8]

$$STE2 = Kb \cdot \cos \delta \quad (8)$$

Further, when sin(e) and cos(e) using the actual displacement phase e is multiplied by a predetermined coefficient K and modified using Expressions (6) to (8), Expressions (9) and (10) below can be obtained.

[Expression 9]

$$K \cdot \sin(e) = K \cdot \sin\delta \cdot \cos(a) + K \cdot \cos\delta \cdot \sin(a) \\ = TE1 \cdot \cos(a) + TE2 \cdot \sin(a) \quad (9)$$

When Expressions (9) and (10) are brought together

[Expression 10]

$$K \cdot \cos(e) = K \cdot \cos\delta \cdot \cos(a) - K \cdot \sin\delta \cdot \sin(a) \\ = TE2 \cdot \cos(a) - TE1 \cdot \sin(a) \quad (10)$$

regarding the actual displacement phase e, Expression (11) below is obtained.

[Expression 11]

$$e = \arctan\left(\frac{(TE1 \cdot \cos(a) + TE2 \cdot \sin(a))}{(TE2 \cdot \cos(a) - TE1 \cdot \sin(a))}\right) \quad (11)$$

In a case where the optical disc apparatus 1 performs the tracking control, the actual displacement phase e becomes a small value close to a value "0". Accordingly, Expression (11) can be approximated as Expression (12) below.

[Expression 12]

$$e = \frac{(TE1 \cdot \cos(a) + TE2 \cdot \sin(a))}{(TE2 \cdot \cos(a) - TE1 \cdot \sin(a))} \quad (12)$$

In this manner, the actual displacement phase e can be expressed using the track displacement phase a, the first tracking error signal STE1, and the second tracking error signal STE2.

When attention is focused on the numerator of Expression (12), the actual displacement phase e is a value obtained by adding the first tracking error signal STE1 and the second tracking error signal STE2 at a ratio corresponding to the track displacement phase a. In other words, the actual displacement phase e is also a value obtained by correcting the first tracking error signal STE1 by the second tracking error signal STE2 and the track displacement phase a.

When seen from another viewpoint, in the numerator of Expression (12), the first tracking error signal STE1 is offset by a distance expressed by the track displacement amount d(φ) or the number of grooves of the track TR expressed by the track displacement phase a(φ).

Incidentally, the actual displacement phase e represents the distance between the irradiation spot on which the focus F of the light beam L is actually set and the ideal spot. Accordingly, when the actual displacement phase e is set as a tracking error signal STE, the optical disc apparatus 1 can set the focus F of the light beam L on the ideal spot.

That is, when the actual displacement phase e in Expressions (11) and (12) is replaced by the tracking error signal STE, Expressions (13) and (14) below are obtained.

[Expression 13]

$$STE = \arctan\left(\frac{(TE1 \cdot \cos(a) + TE2 \cdot \sin(a))}{(TE2 \cdot \cos(a) - TE1 \cdot \sin(a))}\right) \quad (13)$$

The signal processing section 4 of the optical disc

[Expression 14]

$$STE = \frac{(TE1 \cdot \cos(a) + TE2 \cdot \sin(a))}{(TE2 \cdot \cos(a) - TE1 \cdot \sin(a))} \quad (14)$$

apparatus 1 generates the tracking error signal STE as a corrected tracking error signal by Expression (13) or (14).

(1-4-2. Tracking Error Signal Generation Processing and Tracking Control)

Figure 12:
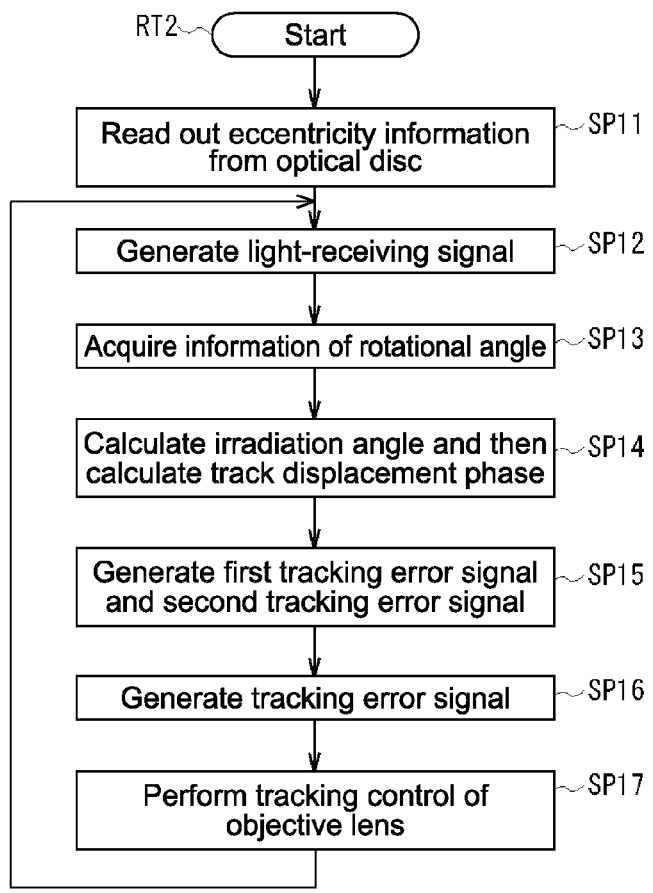
FIG. 12 is a flowchart showing a tracking control processing procedure.

In actuality, the optical disc apparatus 1 performs the tracking control according to a tracking control processing procedure shown in FIG. 12 also when performing any of recording processing and reproduction processing using the optical disc 100.

Specifically, the optical disc apparatus 1 starts a tracking control processing procedure RT2 to proceed to Step SP11. In Step SP11, the controller 2 reads out eccentricity information (eccentric angle φ0 and eccentric distance GD) that is recorded in the management region of the optical disc 100 via the optical pick-up 7, and proceeds to Step SP12.

In Step SP12, the controller 2 irradiates the light beam L onto a desired track TR of recording portions 103 of the optical disc 100 and receives the reflected light beam LR to generate the light-receiving signals SA to SH by the optical pick-up 7. Then, the controller 2 proceeds to Step SP13.

In Step SP13, the controller 2 causes the signal processing section 4 to acquire information on a rotational angle of the optical disc 100 from the spindle motor 5 and proceeds to Step SP14.

In Step SP14, the controller 2 detects an irradiation angle φ by the signal processing section 4 based on the light-receiving signals SA to SH and the rotational angle, calculates a track displacement phase a(φ) according to Expression (3), and proceeds to Step SP15.

In Step SP15, the controller 2 causes the signal processing section 4 to calculate a first tracking error signal STE1 and a second tracking error signal STE2 based on the light-receiving signals SA to SH according to Expressions (4) and (5) above, and proceeds to Step SP16.

In Step SP16, the controller 2 causes the signal processing section 4 to generate a tracking error signal STE by using the track displacement phase a, the first tracking error signal STE1, and the second tracking error signal STE2 according to Expression (13) or (14), and proceeds to Step SP17.

As described above regarding the actual displacement phase e, the tracking error signal STE is a value that represents the displacement amount between the irradiation spot on which the focus F of the light beam L is actually set and the ideal spot.

In Step SP17, the controller 2 causes the drive controller 3 to perform the tracking control of the objective lens 8 based on the tracking error signal STE. Then, the controller 2 returns to Step SP12 and repeats the series of processing.

Accordingly, the optical disc apparatus 1 can cause the focus F of the light beam L to follow the ideal track TI with the rotational center QD (FIG. 4) as the center, not the actual track TR of the recording portion 103 of the optical disc 100.

Here, assuming that the optical disc apparatus 1 causes the focus F of the light beam L to follow the ideal track TI, it is found from FIG. 4 that the focus F follows the track TR while changing a part to be followed one after another.

This appears in the numerator of Expression (14), for example. In other words, when the optical disc apparatus 1 rotates the optical disc 100 by the spindle motor 5, the focus F of the light beam L travels along the ideal track TI. In this case, a value of the irradiation angle φ monotonically increases or decreases.

The cos(a) and sin(a) successively and complementarily vary such that a so-called cosine curve and sine curve are drawn.

Accordingly, while the focus F of the light beam L travels along the ideal track TI, the tracking error signal STE is gradually changed to be only the first tracking error signal STE1 at a certain moment and eventually only the second tracking error signal STE2 after gradually increasing a ratio of the second tracking error signal STE2. The tracking error signal STE is successively changed from only the second tracking error signal STE2 to only the first tracking error signal STE1 again after gradually increasing a ratio of the first tracking error signal STE1.

As described above, the tracking error signal STE successively changes an additional ratio of the first tracking error signal STE1 and the second tracking error signal STE2 in accordance with the change of the irradiation angle φ.

(1-5. Operation and Effect)

In the structure described above, in the optical disc 100, the eccentric state of the track TR of each recording portion 103 is measured by the eccentric-state measurement apparatus 300 and the eccentric angle φ0 and the eccentric distance GD are recorded as the eccentricity information in the management region at the manufacture stage of the optical disc 100.

When performing the recording processing or reproduction processing of the optical disc 100, the optical disc apparatus 1 first reads out the eccentricity information (eccentric angle φ0 and eccentric distance GD) from the management region of the optical disc 100.

After that, the optical disc apparatus 1 irradiates the light beam L onto a desired track TR of the recording portion 103 of the optical disc 100, receives the reflected light beam LR, and generates the light-receiving signals SA to SH by the optical pick-up 7.

The signal processing section 4 detects the irradiation angle φ based on the light-receiving signals SA to SH and the information supplied from the spindle motor 5, and calculates the track displacement phase a(φ) by using that irradiation angle φ, the eccentric angle φ0, and the eccentric distance GD according to Expression (3). Further, the signal processing section 4 calculates the first tracking error signal STE1 and the second tracking error signal STE2 based on the light-receiving signals SA to SH according to Expressions (4) and (5).

Moreover, the signal processing section 4 generates the tracking error signal STE by using the track displacement phase a, the first tracking error signal STE1, and the second tracking error signal STE2 according to Expression (13) or (14).

The drive controller 3 performs the tracking control of the objective lens 8 based on the tracking error signal STE.

Accordingly, the optical disc apparatus 1 can cause the focus F of the light beam L to follow the ideal track TI (FIG. 4) with the rotational center QD as the center even when the track TR of the recording portion 103 of the optical disc 100 is eccentric.

As a result, the optical disc apparatus 1 can perform stable tracking control in which an movement amount of the objective lens 8 in the actual tracking direction is minimum as in the case where the recording processing or reproduction processing is performed on the optical disc 100 having no eccentricity and high accuracy.

Further, the optical disc apparatus 1 can obtain the eccentric angle φ0 and the eccentric distance GD by reading out the eccentricity information from the management region of the optical disc 100. Accordingly, the optical disc apparatus 1 does not need to measure the eccentric angle φ0 and the eccentric distance GD each time the recording processing or reproduction processing is performed.

Furthermore, the eccentric angle φ0 and the eccentric distance GD that are recorded as the eccentricity information in the management region are not changed. Accordingly, the optical disc 100 can be subjected to the tracking control based on generally constant eccentric angle φ0 and eccentric distance GD without being affected by an individual difference of the optical disc apparatus 1.

In addition, the optical disc apparatus 1 can perform the tracking control by only supplying the drive controller 3 with the tracking error signal STE generated according to Expression (13) or (14) instead of a general tracking error signal, unlike an optical disc apparatus in the related art. Accordingly, the optical disc apparatus 1 can adopt the drive controller 3, the actuator 8A, and the like having the same structures as those in the related art, which does not cause highly-advanced or complicated control processing.

The first tracking error signal STE1 and the second tracking error signal STE2 can also be generated based on the light-receiving signals SA to SH. Accordingly, the photodetector 17 can adopt the same structure as in a case of a general optical disc apparatus that supports a three-spot method, which does not cause complication.

Further, in the optical disc 100, accuracy of the coincidence between the rotational center QD and the track center QT is not necessarily increased at the manufacture stage, and lowering of the accuracy in the manufacture is allowed to some extent.

Along with the above effect, it is possible to simplify a position control mechanism or shorten a manufacturing time in the optical disc manufacturing apparatus 200 (FIG. 2), with the result that manufacturing costs of the optical disc 100 can be reduced.

With the structure described above, the optical disc apparatus 1 reads out the eccentric angle φ0 and the eccentric distance GD from the management region of the optical disc 100. The signal processing section 4 calculates the track displacement phase a(φ) by using the irradiation angle φ, the eccentric angle φ0, and the eccentric distance GD, and calculates the first tracking error signal STE1 and the second tracking error signal STE2 based on the light-receiving signals SA to SH. Further, the signal processing section 4 generates the tracking error signal STE by adding the first tracking error signal STE1 and the second tracking error signal STE2 at a ratio corresponding to the track displacement phase a. By performing the tracking control based on the tracking error signal STE, the optical disc apparatus 1 can cause the focus F of the light beam L to follow the ideal track TI with the rotational center QD as the center.

2. Second Embodiment (2-1. Structure of Optical Disc)

In a second embodiment of the present invention, an optical disc 120 (FIG. 1) is used instead of the optical disc 100.

The optical disc 120 is different from the optical disc 100 in that recording portions 123 are provided instead of the recording portions 103. Each of the recording portions 123 is provided with a reflective film 123B instead of the reflective film 103B formed on the recording portion 103.

Figure 13:
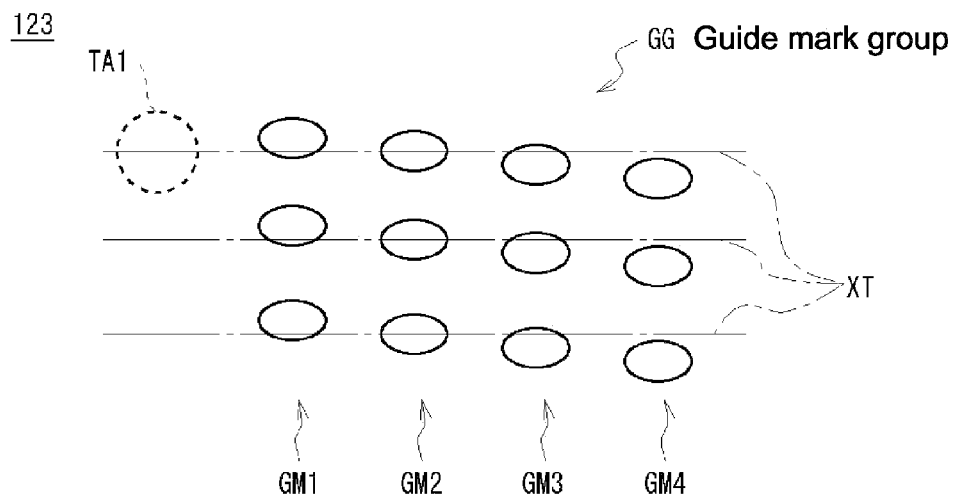
FIG. 13 is a schematic diagram showing a structure of guide marks.

The reflective film 123B is obtained by providing a guide mark group GG as shown in FIG. 13 all over the track TR of the reflective film 103B. The guide mark group GG is constituted of four kinds of guide marks GM1, GM2, GM3, and GM4 whose positions in the tracking direction with respect to the center lines XT of the track TR are different from each other.

The guide marks GM2 are arranged along the center lines XT of the track TR. The guide marks GM1 are arranged more on the outer circumferential side than the guide marks GM2 by a ¼ track. On the other hand, the guide marks GM3 and the guide marks GM4 are arranged more on the inner circumferential side than the guide marks GM2 by a ¼ track and a ½ track, respectively.

In fact, the optical disc 120 has the same structure as the optical disc 100 in the other portions.

Further, in the optical disc 120, an eccentric state of each of the recording portions 123 is measured in advance and eccentricity information indicating the eccentric state is recorded in a management region as in the first embodiment.

(2-2. Structure of Optical Disc Apparatus and Generation of Tracking Error Signal)

An optical disc apparatus 20 according to the second embodiment is different from the optical disc apparatus 1 according to the first embodiment in that the optical pick-up 7 (FIG. 8) has a partially different structure.

Specifically, the optical pick-up 7 according to the second embodiment does not include the grating 12. Accordingly, only one spot TA1 is formed on the recording portion 123 of the optical disc 120 as shown in FIG. 13.

Further, the photodetector 17 does not include the light-receiving area groups 17G2 and 17G3 and includes the light-receiving area group 17G1 only, and generates the light-receiving signals SA to SD.

In addition, the optical disc apparatus 20 includes a signal processing section 24 in place of the signal processing section 4. The signal processing section 24 generates a first tracking error signal STE1 and a second tracking error signal STE2 by an operational technique that is different from the signal processing section 4.

Specifically, in the second embodiment, the optical pick-up 7 sequentially sets the focus F of the light beam L on the guide marks GM1 to GM4 of the guide mark group GG that are provided on the recording portion 123 of the optical disc 120 to be rotated, generates the light-receiving signals SA to SD, and supplies them to the signal processing section 24.

When the focus F of the light beam L is set on the guide marks GM1, GM2, GM3, and GM4, the signal processing section 24 calculates, as sum signals SS1, SS2, SS3, and SS4, respectively, sum signals SS obtained by Expression (15) below.

[Expression 15]

$$SS = SA + SB + SC + SD \quad (15)$$

Subsequently, the signal processing section 24 generates the first tracking error signal STE1 and the second tracking error signal STE2 by Expressions (16) and (17) below, respectively.

[Expression 16]

$$TE1 = SS1 - SS3 \quad (16)$$

[Expression 17]

$$TE2 = SS2 - SS4 \quad (17)$$

In fact, the guide marks GM1 to GM4 are displaced from one another by a ¼ track in the tracking direction on the recording portion 123 of the optical disc 120. Accordingly, by operations of Expressions (16) and (17), the signal processing section 24 can obtain the first tracking error signal STE1 and the second tracking error signal STE2 that are the same as those in the case of performing the operations of Expressions (4) and (5) in the first embodiment.

Further, the signal processing section 24 calculates an irradiation angle $\phi$ based on the eccentric angle $\phi 0$ and the eccentric distance GD that are recorded in the management region of the optical disc 120, the information of the rotational angle supplied from the spindle motor 5, and the like, and then calculates a track displacement phase $a(\phi)$ according to Expression (3).

Moreover, the signal processing section 24 generates a tracking error signal STE by using the track displacement phase a, the first tracking error signal STE1, and the second tracking error signal STE2 according to Expression (13) or (14) as in the first embodiment.

As a result, the optical disc apparatus 20 can cause the focus F of the light beam L to follow the ideal track TI with the rotational center QD (FIG. 4) as the center, not the actual track TR of the recording portion 123 of the optical disc 120 as in the first embodiment.

It should be noted that the optical disc apparatus 20 has the same structure as the optical disc apparatus 1 in the other portions.

(2-3. Operation and Effect)

With the structure described above, in the optical disc 120, the eccentric state of the track TR of each of the recording portions 123 is measured and the eccentric angle $\phi 0$ and the eccentric distance GD are recorded as the eccentricity information in the management region.

When performing the recording processing or reproduction processing of the optical disc 120, the optical disc apparatus 20 first reads out the eccentricity information (eccentric angle $\phi 0$ and eccentric distance GD) from the management region of the optical disc 120.

After that, the optical disc apparatus 20 irradiates the light beam L onto a desired track TR of the recording portion 123 of the optical disc 120, receives the reflected light beam LR, and generates the light-receiving signals SA to SD by the optical pick-up 7.

The signal processing section 24 calculates the irradiation angle $\phi$ based on the light-receiving signals SA to SD and information of the rotational angle, and calculates the track displacement phase $a(\phi)$ by using that irradiation angle $\phi$, the eccentric angle $\phi 0$, and the eccentric distance GD according to Expression (3).

Further, the signal processing section 24 calculates the first tracking error signal STE1 and the second tracking error signal STE2 according to Expressions (16) and (17) by using the sum signals SS1, SS2, SS3, and SS4 obtained when the focus F of the light beam L is irradiated onto the guide marks GM1, GM2, GM3, and GM4, respectively.

Moreover, the signal processing section 24 generates the tracking error signal STE by using the track displacement phase a, the first tracking error signal STE1, and the second tracking error signal STE2 according to Expression (13) or (14).

The drive controller 3 performs the tracking control of the objective lens 8 based on the tracking error signal STE.

Accordingly, the optical disc apparatus 20 can cause the focus F of the light beam L to follow the ideal track TI (FIG. 4) with the rotational center QD as the center even when the track TR of the recording portion 123 of the optical disc 120 is eccentric as in the optical disc apparatus 1.

The optical disc apparatus 20 can also produce the same effect in the other points as the optical disc apparatus 1 of the first embodiment.

With the structure described above, the optical disc apparatus 20 reads out the eccentric angle φ0 and the eccentric distance GD from the management region of the optical disc 120. The signal processing section 24 calculates the track displacement phase a(φ) by using the irradiation angle φ, the eccentric angle φ0, and the eccentric distance GD, and calculates the first tracking error signal STE1 and the second tracking error signal STE2 based on the sum signals SS1 to SS4. Further, the signal processing section 24 generates the tracking error signal STE by adding the first tracking error signal STE1 and the second tracking error signal STE2 at a ratio corresponding to the track displacement phase a. By performing the tracking control based on the tracking error signal STE, the optical disc apparatus 20 can cause the focus F of the light beam L to follow the ideal track TI with the rotational center QD as the center.

3. Other Embodiments

It should be noted that the case where the eccentric distance GD and the eccentric angle φ0 are used for expressing an eccentric state has been described in the first embodiment described above.

The present invention is not limited to the above case. For example, an eccentric track groove number GT may be used instead of the eccentric distance GD, or a distance Δx and a distance Δy that are an x component and a y component of the eccentric distance GD, respectively, may be used for expressing an eccentric state. In this case, the track displacement phase a(φ) only needs to be calculated by replacing Expression (3) by an expression that corresponds to the eccentric track groove number GT or distances Δx and Δy. The same holds true for the second embodiment.

Further, in the first embodiment described above, the case where the tracking error signal STE is generated by changing an additional ratio of the first tracking error signal STE1 and the second tracking error signal STE2 in accordance with the irradiation angle φ (that is, track displacement phase a) as in Expression (13) or (14) has been described.

The present invention is not limited to the above case. For example, when the tracking error signal STE is calculated by Expression (18) below, the tracking error signal STE may be generated by correcting the first tracking error signal STE1 in accordance with the track displacement phase a. The same holds true for the second embodiment.

[Expression 18]

$$STE = TE1 \cdot \cos(a) + TE2 \cdot \sin(a) \tag{18}$$

In addition, in the first embodiment described above, the case where the spot intervals ds between the spot TA1 and each of the spots TA2 and TA3 (FIG. 9), the spots being formed on the optical disc 100, are set to be ¼ of the track pitch TP has been described.

The present invention is not limited to the above case, and the spot intervals ds may be set to be ½ of the track pitch TP. In this case, the tracking error signal STE1 only needs to be calculated using a predetermined coefficient K1 based on a differential push-pull (DPP) method according to Expressions (19) to (21) below.

[Expression 19]

$$MPP = (SA+SD) - (SB+SC) \tag{19}$$

[Expression 20]

[Expression 21]

$$STE1 = MPP - K1 \cdot SPP \tag{21}$$

The tracking error signal STE2 only needs to be calculated using a predetermined coefficient K2 according to Expression (22) below.

[Expression 22]

$$STE2 = (SA+SB+SC+SD) - K2 \cdot (SE+SF+SG+SH) \tag{22}$$

Moreover, in the first embodiment described above, the case where the track pitch TP of the track TR that is actually formed on the recording portion 103 is aligned with a track pitch of the ideal track TI (FIG. 4) has been described.

The present invention is not limited to the above case, and the track pitch of the ideal track TI may be different from the track pitch TP of the track TR. In this case, the tracking error signal STE obtained by Expression (13) or (14) may be multiplied by a correction coefficient corresponding to a distance from the rotational center QD to the irradiation spot of the light beam L, for example. The same holds true for the second embodiment.

In the first embodiment described above, the case where an eccentric state is measured by the eccentric-state measurement apparatus 300 based on the reference-ring boundary SRB of the reference ring SR that is provided on the recording portion 103 of the optical disc 100 has also been described.

The present invention is not limited to the above case. An eccentric state may be measured based on a spot at which a distance from the track center QT becomes constant, for example, by providing a reference ring in the vicinity of an outermost circumferential portion of the recording portion 103 of the optical disc 100 and using a boundary between an inner circumferential side and an outer circumferential side of the reference ring. The same holds true for the second embodiment.

In the first embodiment described above, the case where as initialization processing of the optical disc 100, eccentric states of the recording portions 103 are measured and recorded as eccentricity information in the management region of the optical disc 100 by the eccentric-state measurement apparatus 300 has also been described.

The present invention is not limited to the above case, and the eccentricity information may be recorded in various spots such as an outermost circumference of the track of the optical disc 100, or the eccentricity information of each recording portion 103 may be recorded in an innermost circumference of the track of the recording portion 103.

Moreover, in the present invention, when omitting the initialization processing and performing information recording processing for the first time on the optical disc 100, for example, the optical disc apparatus 1 may measure eccentric states of the recording portions 103 and record them in the management region of the optical disc 100 as the eccentricity information. The same holds true for the second embodiment.

In this case, it is conceived that the optical disc apparatus 1 irradiates the light beam L to the vicinity of the reference-ring boundary SRB of the reference ring SR and performs the tracking control so that the focus F of the light beam L follows the reference-ring boundary SRB. At this time, the optical disc apparatus 1 can recognize a position of the reference-ring boundary SRB in the tracking direction from a value of the obtained tracking error signal.

In the first embodiment described above, the case where the recording layer 103A is formed of a fluorescent recording material that reacts with a blue light beam having a wavelength of about 405 nm has also been described.

The present invention is not limited to the above case. It may be possible to form the recording layer 103A of an optical recording material such as photopolymer and then form a recording mark of a hologram, air bubbles, or the like by irradiation of the light beam L having a high light intensity. As a wavelength of the light beam, various values may be set in accordance with characteristics of the recording materials or the like. The same holds true for the second embodiment.

In the first embodiment described above, the case where the track TR is provided to each of the recording portions 103 of the optical disc 100 has also been described.

The present invention is not limited to the above case. For example, it may be possible to constitute an optical disc by a relatively thick recording layer and a substrate and provide a reflective film including a track TR to only a boundary surface between the recording layer and the substrate. In this case, recording and reproduction of information can be performed using two optical systems as disclosed in Japanese Patent Application Laid-open No. 2008-310848, for example. Further, in this case, a positional displacement of a recording/reproducing optical spot due to an inclination or the like of the optical disc can be corrected by applying the present invention. The same holds true for the second embodiment.

In the first embodiment described above, the case where a spiral track TR is formed on the recording portion 103 of the optical disc 100 has also been described, but the present invention is not limited thereto. For example, a concentric track may be formed.

In addition, the track TR may not be necessarily continuous, and may be intermittently formed, for example. In short, the focus F of the light beam L only needs to be set on the ideal track TI based on the position of the track TR. The same holds true for the second embodiment.

In the first embodiment described above, the case where the optical disc apparatus 1 is capable of performing both recording processing and reproduction processing using the optical disc 100 has also been described.

The present invention is not limited to the above case. For example, the optical disc apparatus 1 may be capable of performing only one of recording processing and reproduction processing using the optical disc 100. The same holds true for the second embodiment.

Moreover, in the embodiments described above, there has been described the case where the optical disc apparatus 1 as an optical disc apparatus is constituted of the spindle motor 5 as a rotation section, the laser diode 11 as a light source, the objective lens 8 as an objective lens, the actuator 8A as a lens moving section, the photodetector 17 as a light-receiving section, the signal processing section 4 as a tracking error signal generation section, eccentric-state acquisition section, and correction section, and the drive controller 3 as a movement control section.

However, the present invention is not limited the above case. An optical disc apparatus may be constituted of a rotation section, a light source, an objective lens, a lens moving section, a light-receiving section, a tracking error signal generation section, an eccentric-state acquisition section, a correction section, and a movement control section that have various other different structures.

The present invention can also be used in an optical disc apparatus that records information such as various types of data including videos and audios on various optical discs and reproduces the information from those optical discs.

The present application contains subject matter related to that disclosed in Japanese Priority Patent Application JP 2009-163939 filed in the Japan Patent Office on Jul. 10, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disc apparatus, comprising:
   a rotation section to rotate an optical disc including a track that is a spiral track or a concentric track formed with a predetermined track center as a center, the center being a rotational center of the optical disc;
   a light source to emit a light beam;
   an objective lens to collect the light beam on the optical disc;
   a lens drive section to drive the objective lens in a tracking direction that traverses the track;
   a light-receiving section to receive a reflected light beam that is reflected by the track formed on the optical disc and generate a light-receiving signal;
   a tracking error signal generation section to generate a first tracking error signal that represents a distance between the track and a focus of the light beam in the tracking direction based on the light-receiving signal;
   an eccentric-state acquisition section to acquire an eccentric state of the center with respect to the rotational center of the optical disc;
   a correction section to generate a corrected tracking error signal that represents a distance with respect to the track with the rotational center of the optical disc as the center by correcting the first tracking error signal based on the eccentric state; and
   a drive control section to drive the objective lens in the tracking direction by the lens drive section based at least in part on the corrected tracking error signal,
   wherein the optical disc has a reference direction that is defined with respect to a rotational angle with the rotational center as the center,
   wherein the eccentric-state acquisition section acquires an eccentric distance that is a distance from the rotational center of the optical disc to the center and an eccentric angle that is an angle formed by the center and the reference direction with the rotational center of the optical disc as the center,
   wherein the tracking error signal generation section determines an irradiation spot angle that is an angle formed by an irradiation spot of the light beam and the reference direction with the rotational center of the optical disc as the center based on the light-receiving signal, and
   wherein the correction section generates the corrected tracking error signal by correcting the first tracking error signal by using the irradiation spot angle, the eccentric angle, and the eccentric distance.

2. The optical disc apparatus according to claim 1,
   wherein the optical disc includes the track with predetermined track intervals, and
   wherein when the irradiation spot angle is denoted by $\phi$, the eccentric angle is denoted by $\phi 0$, and a displaced track groove number that is obtained by converting the eccentric distance into the number of grooves of the track is denoted by GT, the correction section generates the corrected tracking error signal by offsetting the first tracking error signal by GT·cos(φ+φ0) corresponding to a number of grooves of the track.

3. An optical disc apparatus, comprising:

a rotation section to rotate an optical disc including a track that is a spiral track or a concentric track formed with a predetermined track center as a center, the center being a rotational center of the optical disc;

a light source to emit a light beam;

an objective lens to collect the light beam on the optical disc;

a lens drive section to drive the objective lens in a tracking direction that traverses the track;

a light-receiving section to receive a reflected light beam that is reflected by the track formed on the optical disc and generate a light-receiving signal;

a tracking error signal generation section to generate a first tracking error signal that represents a distance between the track and a focus of the light beam in the tracking direction based on the light-receiving signal;

an eccentric-state acquisition section to acquire an eccentric state of the center with respect to the rotational center of the optical disc;

a correction section to generate a corrected tracking error signal that represents a distance with respect to the track with the rotational center of the optical disc as the center by correcting the first tracking error signal based on the eccentric state; and a drive control section to drive the objective lens in the tracking direction by the lens drive section based at least in part on the corrected tracking error signal, wherein the tracking error signal generation section generates, in addition to the first tracking error signal, a second tracking error signal that represents a distance between a separate line that is away from an imaginary center line of the track by a predetermined distance in the tracking direction and the focus of the light beam, and wherein the correction section generates the corrected tracking error signal by adding the first tracking error signal and the second tracking error signal at a ratio corresponding to the eccentric state.

4. The optical disc apparatus according to claim 3, wherein the correction section generates the corrected tracking error signal denoted by STE from one of expressions below $$STE = TE1 \cdot \cos(a) + TE2 \cdot \sin(a) \quad (1)$$

$$STE = \arctan\left(\frac{(TE1 \cdot \cos(a) + TE2 \cdot \sin(a))}{(TE2 \cdot \cos(a) - TE1 \cdot \sin(a))}\right) \quad (2)$$

and $$STE = \frac{(TE1 \cdot \cos(a) + TE2 \cdot \sin(a))}{(TE2 \cdot \cos(a) - TE1 \cdot \sin(a))} \quad (3)$$

where a track displacement phase is denoted by a, the first tracking error signal is denoted by STE1, and the second tracking error signal is denoted by STE2, the track displacement phase being obtained by converting a component in the tracking direction at a spot to which the light beam is irradiated in the eccentric state into a track pitch of the track.

5. The optical disc apparatus according to claim 4, wherein the tracking error signal generation section generates the second tracking error signal in accordance with a distance between the separate line that is away from a pseudo center line of the track by a ¼ track in the tracking direction and the focus of the light beam.

6. The optical disc apparatus according to claim 4, wherein the tracking error signal generation section generates the second tracking error signal in accordance with a distance between the separate line that is away from a pseudo center line of the track by a ½ track in the tracking direction and the focus of the light beam.

7. The optical disc apparatus according to claim 3, further comprising a light division section to divide the light beam into a main beam and at least one sub-beam, wherein the objective lens collects the main beam and the at least one sub-beam so that the main beam and the at least one sub-beam are away from each other by the predetermined distance in the tracking direction, wherein the light-receiving section receives each of the main beam and the at least one sub-beam out of the reflected light beam to generate the light-receiving signal, and wherein the tracking error signal generation section generates the first tracking error signal and the second tracking error signal by using the light-receiving signal obtained based on each of the main beam and the at least one sub-beam.

8. The optical disc apparatus according to claim 3, wherein the optical disc includes a guide mark on each of an extension of the track and the separate line, and wherein the tracking error signal generation section generates the first tracking error signal based on the light-receiving signal obtained when the light beam is irradiated onto a first guide mark provided on the extension of the track, and generates the second tracking error signal based on the light-receiving signal obtained when the light beam is irradiated onto a second guide mark provided on the separate line.

9. The optical disc apparatus according to claim 1, wherein the eccentric state is measured in advance by a predetermined measurement apparatus and recorded in a management region of the optical disc in advance by a predetermined recording apparatus, and wherein the eccentric-state acquisition section reads out the eccentric state from the management region of the optical disc.

* * * * *